(No Model.)
O. A. MOSES.
STORAGE BATTERY.
No. 352,708. Patented Nov. 16, 1886.
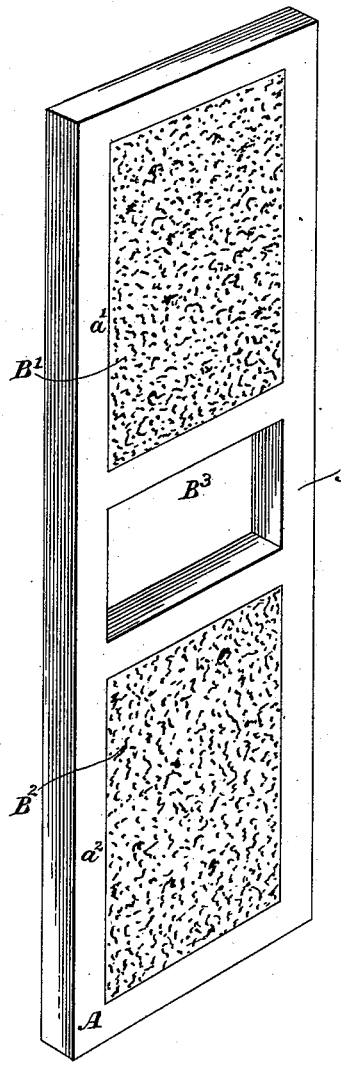
Fig. 1,
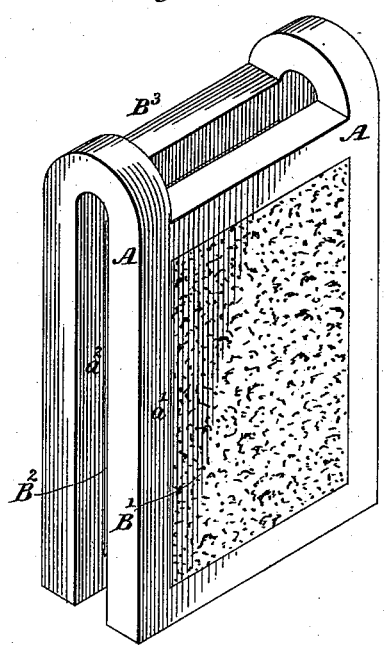
Fig. 2,
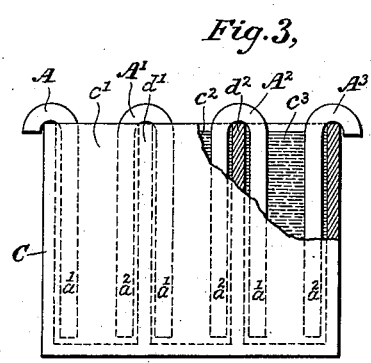
Fig. 3,
Witnesses
Geo. W. Breck
Ulysses W. Cook
Inventor
Otto A. Moses,
By his Attorneys
Pope & Edgecomb

UNITED STATES PATENT OFFICE.

OTTO A. MOSES, OF NEW YORK, N. Y.

STORAGE-BATTERY.

SPECIFICATION forming part of Letters Patent No. 352,708, dated November 16, 1886.

Application filed January 18, 1886. Serial No. 188,826. (No model.)

*To all whom it may concern:*

Be it known that I, OTTO A. MOSES, a citizen of the United States, residing in the city of New York, in the county and State of New York, have invented a new and useful Improvement in Storage-Batteries, of which the following is a specification.

The invention relates to the manufacture and form of secondary or storage battery plates and the method of employing them.

The object of the invention is to simplify the manufacture of the plates, insure that the porous or cellular portion shall be in perfect electrical connection with the base or frame of the plates, and to dispense with the employment of binding-screws and coupling devices for connecting different plates.

The invention consists in first forming a frame of lead having two rectangular openings. These openings are each closely packed with freshly-cut shavings of lead, the shavings preferably consisting of turnings from a cylinder of lead. Before they are packed in the frame the surfaces of the latter are made bright and free from oxidation, so that the lead of the shavings and the lead of the frame come into intimate contact and cohere. The plates so prepared are bent so that the two openings lie in parallel planes. The battery is then made up of a series of cups or cells containing the electrolyte, and the plates are placed each with one arm in one cell and the other arm in the adjacent cell.

In the accompanying drawings, Figure 1 is a plan of a frame of a plate partially prepared. Fig. 2 shows the plate filled and bent into the form in which it is to be employed. Fig. 3 illustrates the method of placing the plates in the cells.

Referring to the figures, A represents a frame of lead, in which are formed two large openings or spaces, B' and $B^2$, and it is designed that the packing of finely-divided lead shall be placed in these openings. Fine shavings of lead are formed by turning from a solid block or cylinder of lead, and these, while still freshly cut and before they have had opportunity to oxidize, are packed into the openings B' and $B^2$. The inner surfaces of the frame, against which the shavings press, are first scraped bright, thus insuring that the lead shavings shall not only make contact with the frame, but shall become integral therewith.

An opening, $B^3$, is formed across the center of the plate for the purpose of making the plate lighter and economizing the lead. Across the line of this opening the plate is bent until the sides $a'$ and $a^2$ are parallel with each other, and the plate assumes the form indicated in Fig. 2.

The complete battery is preferably formed by dividing a tank, C, into compartments $c'$, $c^2$, &c., by partitions $d'$ $d^2$, &c. A plate, A', is placed in the tank so that it rests upon the partition $d'$, with its two sides extending into the adjacent compartments, $c'$ and $c^2$. The second plate, $A^2$, is supported by the partition $d^2$, and extends into the compartments $c^2$ and $c^3$, and in like manner the entire series is supported.

An electrolyte consisting preferably of dilute sulphuric acid is supplied to the compartments. The battery is then prepared by successively charging and discharging it in any well-known manner. One arm, $a'$, for instance, of each plate constitutes a positive electrode, and the other arm, $a^2$, the negative.

I claim as my invention—

1. In a secondary or storage battery, a series of fluid-containing compartments and a removable U-shaped battery-plate of lead having its respective arms integral with each other and extending into different compartments, one arm constituting a positive and the other a negative electrode.

2. A storage-battery plate consisting of a U-shaped frame having the greater portion of each side removed and a packing of lead placed in each of the openings formed, substantially as described.

3. A storage-battery plate consisting of the frame A, having the three openings B', $B^2$, and $B^3$, and the packing of freshly-divided lead in the openings B' and $B^2$, such packing cohering with the adjacent sides of the frame.

4. A bent plate of lead for a storage-battery, having its legs, respectively, positively and negatively charged.

In testimony whereof I have hereunto subscribed my name this 15th day of January, A. D. 1886.

OTTO A. MOSES.

Witnesses:
CAROLINE E. DAVIDSON,
CHARLES A. TERRY.